(12) United States Patent
Iwabuchi

(10) Patent No.: US 7,828,267 B2
(45) Date of Patent: Nov. 9, 2010

(54) SLIDE VALVE

(75) Inventor: Toshiaki Iwabuchi, Gunma (JP)

(73) Assignee: Kitz SCT Corporation, Tokyo (JP)

( * ) Notice: Subject to any disclaimer, the term of this patent is extended or adjusted under 35 U.S.C. 154(b) by 455 days.

(21) Appl. No.: 11/921,310

(22) PCT Filed: Jun. 8, 2006

(86) PCT No.: PCT/JP2006/311546

§ 371 (c)(1),
(2), (4) Date: Nov. 30, 2007

(87) PCT Pub. No.: WO2007/013227

PCT Pub. Date: Feb. 1, 2007

(65) Prior Publication Data

US 2009/0127487 A1 May 21, 2009

(30) Foreign Application Priority Data

Jul. 29, 2005 (JP) .............................. 2005-221772

(51) Int. Cl.
*F16K 25/00* (2006.01)
(52) U.S. Cl. ...................... 251/175; 251/193; 251/303
(58) Field of Classification Search ................. 251/175, 251/193, 298, 301, 302, 303
See application file for complete search history.

(56) References Cited

U.S. PATENT DOCUMENTS 3,524,467 A * 8/1970 Worley ........................ 137/340

(Continued)

FOREIGN PATENT DOCUMENTS

JP 49-34390 9/1974

(Continued)

OTHER PUBLICATIONS

International Search Report issued Aug. 1, 2006 in the International (PCT) Application of which the present application is the U.S. National Stage.

*Primary Examiner*—John K Fristoe, Jr.
(74) *Attorney, Agent, or Firm*—Wenderoth, Lind & Ponack, L.L.P.

(57) ABSTRACT

A slide valve is provided, in which the conductance in the minimum region is controllable with high accuracy to enable stable control, a slide plate is prevented from plastically deforming to acquire good controllability of the minimum flow rate, and it is possible to detach a valve element and an air drive portion integrally with the slide plate, thereby facilitating the maintenance. The slide valve includes a body having a flow path, a slide plate provided within the body and between a closing position preventing a flow on the flow path and an open position permitting the flow, disposed perpendicularly relative to a flow path axis and movable horizontally or on a straight line, and a valve element incorporated in the slide plate and operated in a direction of the flow path axis to switch between the closing position and the open position of the slide plate by air cylinder drive. The slide plate has an upper surface and a lower surface that form small clearances in cooperation with the body when the valve element is in the open position, thereby enabling control of the minimum conductance. When the valve element has been in the closing position to induce a pressure difference load, the slide plate when receiving the pressure difference load is not plastically deformed.

7 Claims, 18 Drawing Sheets

U.S. PATENT DOCUMENTS

| | | | |
|---|---|---|---|
| 4,381,100 A * | 4/1983 | Schoenberg | 251/368 |
| 5,087,017 A * | 2/1992 | Sawa et al. | 251/175 |
| 6,056,266 A * | 5/2000 | Blecha | 251/158 |
| 7,270,311 B1 * | 9/2007 | Brenes | 251/175 |
| 7,413,162 B2 * | 8/2008 | Geiser | 251/175 |
| 7,658,367 B2 * | 2/2010 | Geiser | 251/301 |

FOREIGN PATENT DOCUMENTS

| | | |
|---|---|---|
| JP | 60-252874 | 12/1985 |
| JP | 62-16868 | 1/1987 |
| JP | 62-112361 | 7/1987 |
| JP | 3-44273 | 4/1991 |
| JP | 9-178000 | 7/1997 |
| JP | 9-210222 | 8/1997 |
| JP | 2001-263505 | 9/2001 |
| JP | 2002-295695 | 10/2002 |
| JP | 2003-65448 | 3/2003 |
| JP | 2005-9678 | 1/2005 |
| JP | 2005-106118 | 4/2005 |

* cited by examiner

SLIDE VALVE

BACKGROUND OF THE INVENTION

1. Technical Field

The present invention relates to a slide valve, particularly to a slide valve having a body with a pendular plate that is laterally movable in the horizontal direction relative to its flow path axis to cause its valve member to shut off the flow path of its valve port at a fully closed position.

2. Background Art

A slide valve of this kind generally attains its switching and controlling while making a lateral or horizontal movement to move to a fully open position and a fully closed position within a flat hollow valve casing. As a conventional slide valve, there has been proposed a configuration which has mounted on a valve casing an air driving portion for sealing a valve seat, and has installed within the valve casing a detachable seal ring for sealing the valve seat. The configuration causes the seal ring to be pressed against a movable swing plate in a state in which the swing plate has moved to a valve-closing position, thereby enabling the valve seat to be sealed (refer to Patent Document 1). Since Patent Document 1 adopts a structure in which the backing pressure is exerted only to the difference in area between the diameters of an O-ring of the seal ring for sealing the valve seat and a slidable O-ring, it is at an advantage in establishing sealing while bearing a thrust of the pressure difference between the atmospheric pressure and a vacuum with a small valve thrust.

There has also been proposed a slide valve having a structure in which a swing plate is provided on the circumferential portion thereof with convexo-concave parts or grooves to make the controllability of the minimum flow rate good (refer to Patent Document 2). There has been known, as another system for making the controllability good, a valve having a structure having a contact ring attached to a slide plate and, when the slide plate is in a closed position, bringing the contact ring into pressure contact with the contact surface of a body due to the biasing force of a spring (refer to Patent Document 3).

As another conventional example, a gate valve has been proposed, which has a structure wherein a cam using a roller is used to spread a valve element and a plate installed on the back surface of the valve element to the opposite sides when blocking the valve element and press the plate against the inner surface of a body to receive on the plate a load of blocking the valve element, thereby completing the valve blocking (refer to Patent document 4). In this gate valve, the spreading of the valve element and the plate to the opposite sides by the cam causes an O-ring for sealing a valve seat to be pressed, thereby allowing the roller to ride over the horizontal position of the cam. As a result, since a thrust resulting from the pressure difference between the atmospheric pressure and a vacuum is not converted into a force in a valve-opening direction, sealing can be retained.

Patent Document 1: JP-A HEI 9-178000
Patent Document 2: JP-A HEI 9-210222
Patent Document 3: JP-A 2005-9678
Patent Document 4: JP-A 2002-295695

PROBLEMS TO BE SOLVED BY THE INVENTION

However, each of Patent Documents 1 and 2 has a structure having the seal ring disposed on the side of a body and a slide plate engaged with the seal ring at a closed position at which a fluid is prevented from flowing, thereby closing the valve. When the side of the slide plate is retained at an atmospheric pressure, whereas the side of the seal ring is evacuated to a vacuum, a load resulting from the pressure difference between the two sides flexes the slide plate. In addition, the thrust of the cylinder for closing the valve element is smaller than the pressure difference load, and the seal ring is pushed up by the amount of an operation stroke to constitute a stopper. Therefore, it is necessary to set the amount of the slide plate flexed to be large. When the slide plate has weak rigidity, an arm of the slide plate that has received the valve thrust and pressure difference load in consequence of the valve being closed is bent by plastic deformation to come into contact with the body. As a result and in view of the fact that it is impossible to set the clearance between the slide plate and the body to be narrow, the minimum control conductance becomes large and consequently the minimum controllability becomes deteriorated. To cope with this problem and improve the minimum controllability, as disclosed in Patent Document 3, the slide plate is equipped with a contact ring. However, the adoption of the structure that attains the contact and then the slide is, if anything, prone to production of particles.

Since Patent Document 4 adopts the structure of spreading the valve element and the plate installed on the back surface of the valve element to achieve sealing, no bending load is exerted onto the arm portion of the swing plate. However, since the drive portion of the plate that receives the load has to be provided with a mechanism, such as a cam, the entire structure becomes complicated and particles may possibly be produced with ease. In addition, the operation under a vacuum or the operation using a heating temperature (150° C.) allows ready generation of a scraping phenomenon in the cam mechanism portion. Furthermore, since a load for sealing the O-ring for the valve seal is required to be 150 kg or more in the case of a valve element of 320 A, for example, a thrust of around 20 to 30 kg for removing the cam is required. For this reason, a large torque is required in order to generate the thrust at a distance from the rotary shaft to the center of the slide plate.

Moreover, since the pressure control can be utilized from the position at which the valve element is opened as the initiation of a control range, the control range can be made wide. However, in order to eliminate contact with the O-ring for sealing the valve element, it is necessary to set a large clearance for opening the valve element. The O-ring for sealing the valve element is prone to deformation by the influence of a closing load and heat and, when it is intended to control the deformation by the clearance between the body and the O-ring, since the clearance is unstable and since a variation or a dead band in conductance characteristic is easily induced in the control ranges of the valve element being opened and closed in the flow path axis direction and of the slide plate being slid and, in particular, when adding to a backlash and a wear of the cam mechanism, the minimum control range becomes further unstable. In addition, in Patent Documents 1 to 4, since the drive portion for closing the valve element is disposed on the side of the valve box or driven by the complicated cam mechanism, the maintenance of all portions including the drive portion is performed only with difficulty.

The present invention has been accomplished in view of the above state of affairs and the object thereof is to provide a slide valve that makes it possible to control the conductance in the minimum region with high precision, thereby attaining stable control, further not to induce plastic deformation of a slide plate, thereby attaining good controllability of the minimum flow rate and to detach the valve element, air drive portion and slide plate all together, thereby facilitating the maintenance thereof.

SUMMARY OF THE INVENTION

To attain the above object, the invention is directed to a slide valve comprising a body having a flow path; a slide plate having elasticity, provided within the body and between a closing position preventing a flow on the flow path and an open position permitting the flow, disposed perpendicularly relative to a flow path axis and movable horizontally or on a straight line; and a valve element incorporated in the slide plate and operated in a direction of the flow path axis to switch between the closing position and the open position of the slide plate. The slide plate has an upper surface and a lower surface that form small clearances in cooperation with the body when the valve element is in the open position, and one of the upper and lower surfaces of the slide plate constitutes a stopper when the valve element has been in the closing position to induce a pressure difference load. The small clearances are kept constant due to the elasticity of the slide plate when the valve element has been in the open position. That is to say, the slide valve has a structure that can avoid plastic deformation even when receiving the pressure difference load because the slide plate is elastically deformed by an amount of the small clearance to function as the stopper in the closing position of the valve element. Incidentally, in the case of a slide valve for control, clearances are formed between the body and the upper and lower surfaces of the slide plate to control the minimum conductance.

The invention is also directed to the above slide valve wherein one of the upper and lower surfaces of the slide plate constitutes a stopper when the valve element is in the closed position to be elastically deformed by an amount of one of the clearances, thereby forming a structure not to be elastically deformed in the presence of the stopper even when having received a pressure difference load.

The invention is also directed to the above slide valve wherein the stopper has a projecting stopper surface and the valve element is disposed slightly inward of the stopper surface, whereby one or both of the clearances enables control of a minimum flow rate.

The invention is also directed to a slide valve comprising a body having a flow path and a rotary shaft; a slide plate having a proximal end, provided within the body and between a closing position preventing a flow on the flow path and an open position permitting the flow, disposed perpendicularly relative to a flow path axis and movable horizontally; and a valve element incorporated in the slide plate and movable in a direction of the flow path axis to switch between the closing position and the open position of the slide plate. The proximal end of the slide plate is detachably attached to the rotary shaft of the body.

The invention is also directed to the above slide valve wherein the proximal end of the slide plate has a trapezoidal shape and the rotary shaft of the body has a trapezoidal portion in which the trapezoidal shape is fitted. The proximal end is connected to the rotary shaft, with the trapezoidal shape fitted in the trapezoidal portion.

The invention is also directed to the above slide valve wherein the rotary shaft has a screw part to which the proximal end of the slide plate is fastened via a nut, and the slide plate is movable horizontally in a state of being not slid.

The invention is also directed to the above slide valve wherein the screw part of the rotary shaft is provided midway thereof with an unwrought part at which the nut is idled to be prevented from falling off.

The invention is also directed to the above slide valve wherein the rotary shaft has a communication hole and an air discharge path at a portion thereof to be connected to the proximal end of the slide plate, and the slide plate has an air supply and discharge port and an air discharge port. A detachable O-ring is also provided for simultaneously sealing the communication hole, air discharge path, air supply and discharge port and air discharge port.

The invention is also directed to the above slide valve, further comprising a cylinder for closing the valve element. The cylinder has a piston rod having a dual seal structure and the air discharge port of the slide plate communicates with an intermediate part of the dual seal structure.

The invention is also directed to the above slide valve wherein the valve element is incorporated in the slide plate on a downstream side of the slide plate.

The invention is also directed to the above slide valve further comprising an apparatus chamber having an opening, wherein the body is attached directly to the opening.

EFFECTS OF THE INVENTION

According to the invention, the clearances between the body and the upper and lower surfaces of the slide plate can be set with accuracy to have a size capable of controlling the minimum conductance and, since the control can be attained at two places of the upper and lower surfaces or at one-side clearance surface, the minimum flow rate can be controlled with high accuracy to one second, for example, as compared with a conventional slide valve.

According to the invention, the valve element is incorporated in the slide plate so as to switch in the direction of the flow path axis by the air cylinder drive and is housed below the upper end face of the slide plate, thereby setting the small clearances between the body and the upper and lower surface of the slide plate. The valve element is incorporated in the slide plate so as to switch in the direction of the flow path axis by means of the air cylinder drive and can be housed at a position lower by around 1 mm, for example, than the upper end face (stopper surface) of the slide plate, thereby preventing the clearances from being changed owing to the deformation of the seal ring (O-ring) attached to the valve element to thereby enable stable control.

According to the invention, the stopper has a projecting stopper surface on the outer circumference of the slide plate and the valve element is disposed slightly inward of the stopper surface. Thus, the stopper surface can serve as a control surface that controls the minimum flow rate using the clearances at the upper and lower surfaces of the slide plate to thereby make minimum the clearance between the body surface and the stopper surface, resulting in enabling control of a small pressure and highly accurate control as compared with the prior art.

When inducing in the slide plate a pressure difference between the atmospheric pressure and a vacuum in consequence of the valve element being closed, for example, the slide plate is flexed within the range of its plastic deformation to form stoppers (parts X and Y in the drawing) between the body and the upper and lower surfaces of the slide plate depending on the direction in which the pressure difference load is exerted and, as a result, the slide plate is not deformed plastically even when having received the valve thrust and the pressure difference load. Therefore, the slide plate suppresses its flexion by its own weight to around 0.1 mm or less, for example, to enable the clearances between the body and the slide plate to be made minimum. When the slide plate has been made highly rigid, the maximum pressure difference to be used, induced in the slide plate during the course of pressure control can be made high.

According to the invention, since both the air supply and discharge port formed in the portion of connection between the proximal end of the slide plate and the rotary shaft and the discharge port formed in the cylinder piston can simultaneously be sealed with the detachable seal, the valve element and the air drive part can easily be detached integrally with the slide plate, thereby enabling the maintenance at the time of cleaning etc. to be performed with ease. Particularly, since the action of only fastening the slide plate to the rotary shaft with a nut etc. from above enables sealing the two places of the air supply and discharge ports and determining the position of the slide plate to be attached, the workability of the attachment and detachment of the slide plate becomes extremely good.

According to the invention, since the fitting portion between the slide plate and the rotary shaft is formed into a trapezoid, the slide plate is guided to the tapered surface of the trapezoidal portion of the rotary shaft, thereby attaining infallible and easy connection to the rotary shaft.

According to the invention, the screw part of the rotary shaft is provided midway thereof with an unwrought part at which the nut is idled to be prevented from falling off even when it is loosened.

According to the invention, the piston rod of the cylinder for closing the valve element has a dual seal structure and the intermediate portion of the dual seal is connected to the discharge port. Since the intermediate portion is connected to the discharge port on the back side of the piston to release the pressure into the atmosphere, the exertion of the operation pressure difference. Therefore, it is possible to make a leak from the seal part to the outside during the operation of piston to enable the valve element to be operated with exactitude.

According to the invention, since the valve element is incorporated in the slide plate on the downstream side, the valve element is less liable to be influenced by the fluid flow to suppress corrosion thereof.

According to the invention, since the body is attached directly to the opening of the apparatus chamber, use of a piping can be saved to make the apparatus compact.

EXPLANATION OF REFERENCE NUMERALS

Figure 1:
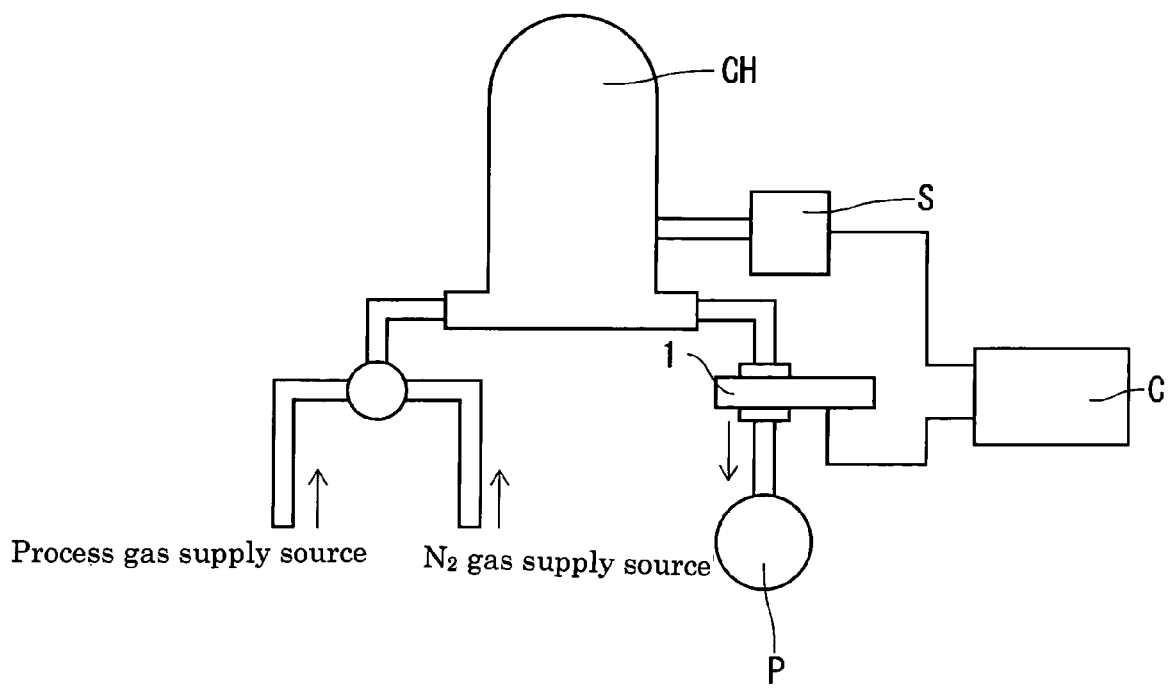
FIG. 1 is a schematic view showing the configuration of a pressure control system having attached thereto a slide valve according to one embodiment of the present invention.

1 Slide valve
2 Flow path
3 Body
4 Slide plate
7 Rotary shaft
13 Valve element
14 Stopper
15 Valve seat surface
17, 18 Clearances
19 Control rib
20 Piston
27 Spring
30 Valve cylinder
31 Swing cylinder
36 Motor

DETAILED DESCRIPTION OF THE INVENTION

A preferred embodiment of a slide valve according to the present invention will be described in detail with reference to the drawings. FIG. 1 is a schematic view showing the configuration of a pressure control system having attached thereto a slide valve according to one embodiment of the present invention. In the figure, a process gas or $N_2$ gas is supplied into a chamber CH having an exhaust side provided with a slide valve 1, a pressure sensor S, a valve controller C and a pump P.

Figure 2:
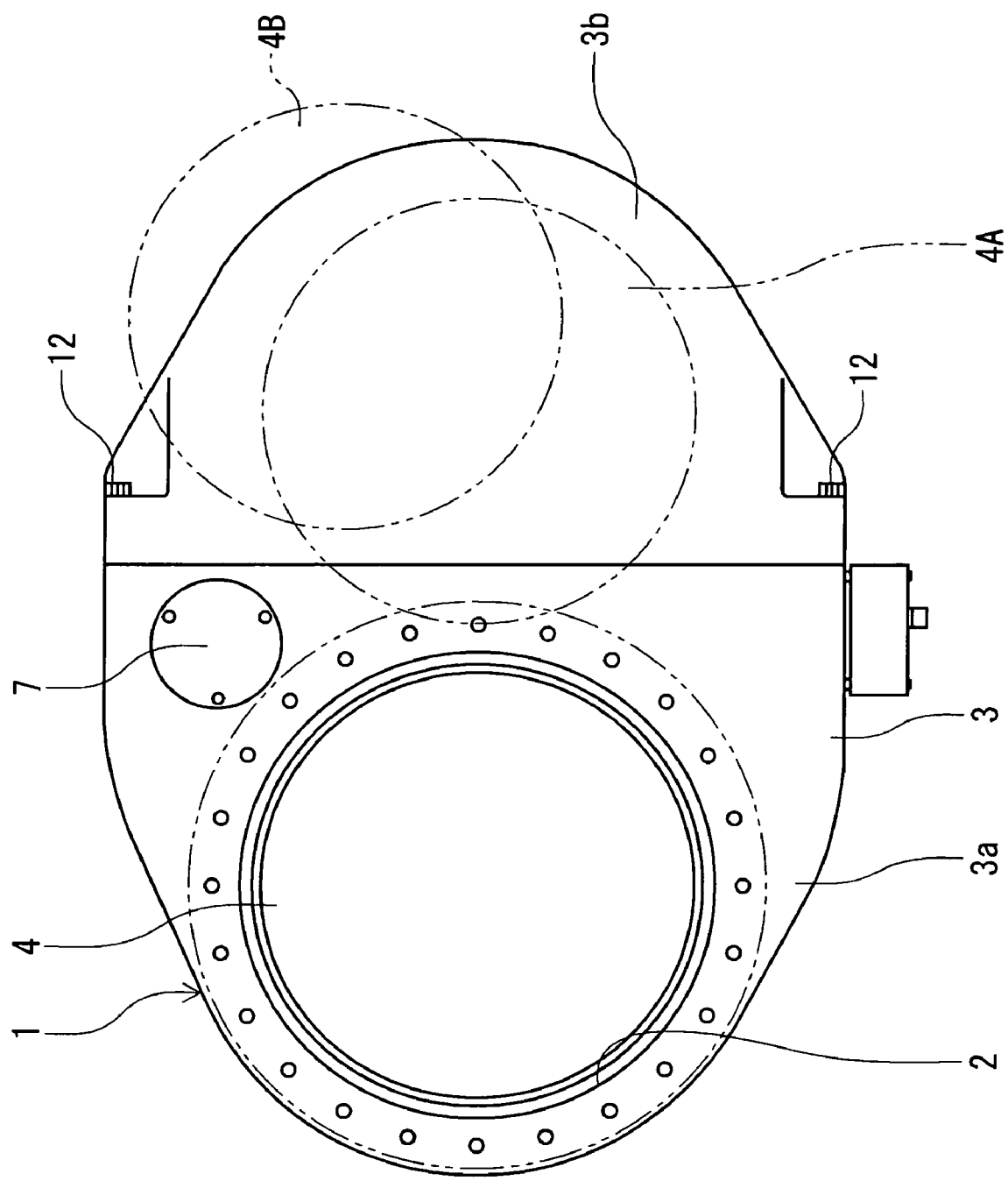
FIG. 2 is a plan view of the slide valve shown in FIG. 1.
Figure 3:
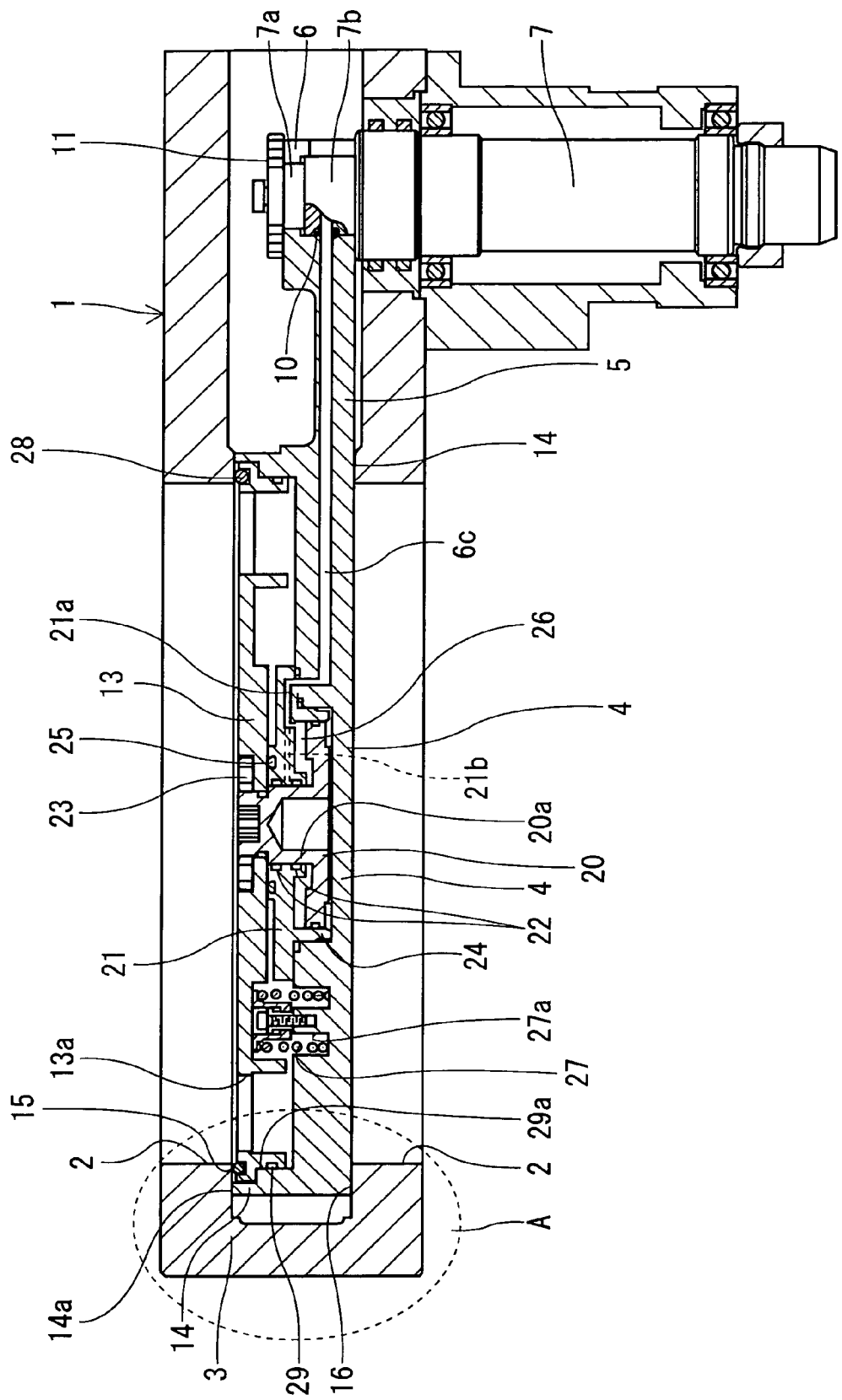
FIG. 3 is a vertical cross section showing the principal part of the slide valve shown in FIG. 2.

FIG. 2 is a plan view of the slide valve 1 and FIG. 3 is a vertical cross section showing the principal part of the slide valve 1. In FIGS. 2 and 3, the slide valve 1 has a body 3 comprising a main body 3a and a cover body 3b. The cover body 3b is attached to the main body 3a with fastening means 12, such as bolts, so that it may be separated from the main body when performing the maintenance of the body.

The body 3 has a flow path 2 and is provided therein with a slide plate 4 that is disposed vertically relative to a flow path axis between a closed position at which a flow on the flow path is blocked and an open position at which the flow is permitted and moves horizontally. While the slide plate 4 in this embodiment is disposed vertically relative to the flow path axis and moves horizontally, it may move on a straight line. Incidentally, 4A and 4B in the figure denote the positions to which the slide plate 4 is moving.

The slide plate 4 has a valve element 13 combined therewith. A cylinder housing 21 is attached to a piston rod 20a provided at the center of a disc-shaped piston 20 via O-rings 22 and 22 and O-rings 24 and 25. The valve element 13 is fixed to the upper portion of the piston rod 20a by means of a nut 23.

Within the body 3, the slide plate 4 has a structure capable of performing opening and closing without being slid, except for the sliding of a rotary shaft 7. Stoppers 14 and 14 formed on the upper and lower surfaces of the slide plate 4 enable the amount of the slide plate 4 being flexed to be controlled to the minimum and the slide plate 4 can operate with the amount of flexure by plastic deformation to prevent contact with the body 3. That is to say, the stoppers are provided at the central section intersecting the length direction of the circular shape of the slide plate 4 to infallibly prevent contact with the body 3.

Since the slide plate 4 is provided with the stoppers 14 and 14 as described above, no bending load is exerted on the slide plate 4 even when there induces a difference between the vacuum and the atmospheric pressure after the valve seal has been sealed. Therefore, it is made possible to infallibly prevent plastic deformation. Particularly, when the slide plate is under the condition of 300 A or 250 A, by providing stepped surfaces having a length of around 0.3 to 0.4 mm on the semicircular portion of the lower surface of the slide plate 4 and the other semicircular portion and locating the upper and lower stoppers at the central section of the slide plate, it is made possible to prevent plastic deformation of the slide plate 4 and to retain the small clearance between the slide plate 4 and the body 3 constant.

When, due to closing the valve element 13, the pressure difference is produced in the slide plate between the atmospheric pressure and the vacuum pressure, the slide plate is flexed by plastic deformation, and the upper and lower surfaces of the slide plate 4 constitute the stoppers 14 and 14 depending on the direction of the pressure difference load and consequently the slide plate 4 has a structure not plastically-deformed even when the valve thrust and pressure difference load are exerted thereon. The valve element 13 has a plurality of holes 13a uniformly bored therein, and the holes 13a can attain the pressure balance. In the figure, denoted by 14a is the stopper surface of the stopper 14.

Figure 4:
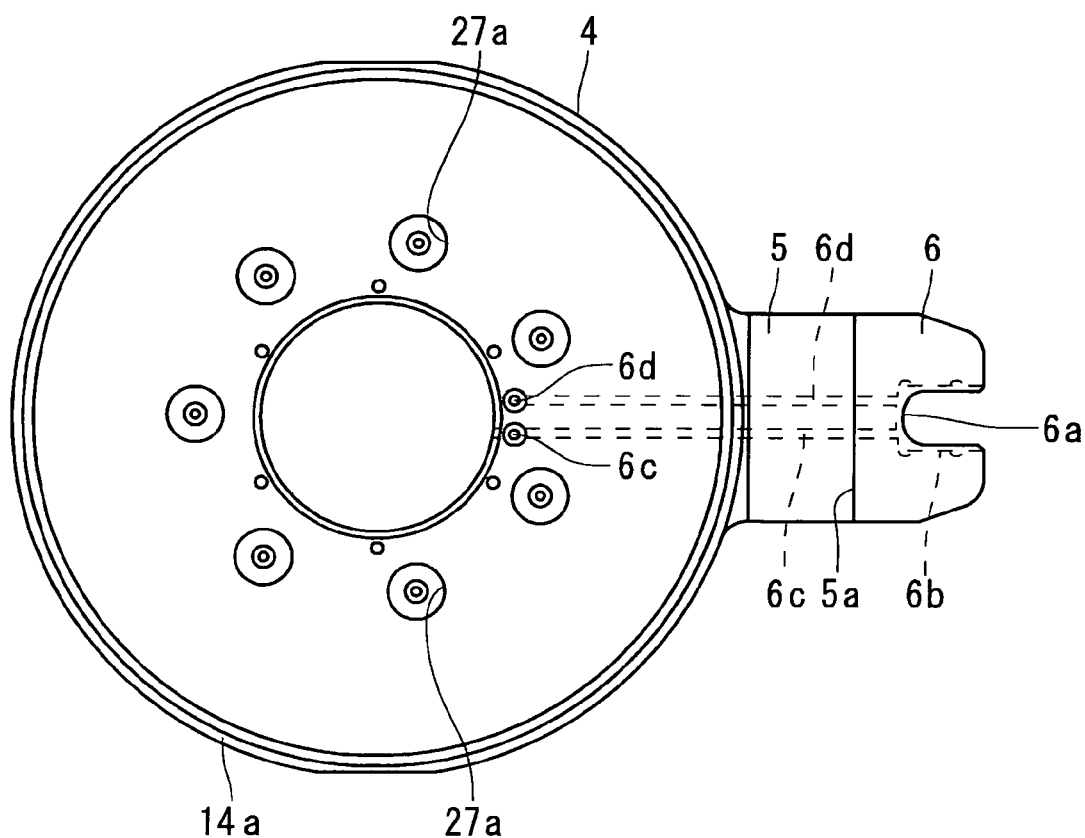
FIG. 4 is a plan view of a slide plate shown in FIG. 3.
Figure 5:
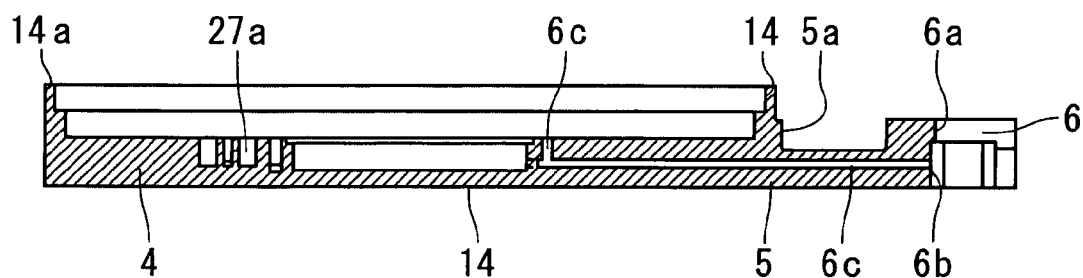
FIG. 5 is a vertical cross section of the slide plate shown in FIG. 4.

Outside the cylinder housing 21, plural (e.g. five to seven) mounting holes 27a are bored both in the lower surface of the valve element 13 and in the upper surface of the slide plate 4 shown in FIGS. 4 and 5, and a spring 27 is disposed in each of the mounting holes. The valve element 13 is arranged to close by the snap action of the springs 27 when discharging the air. In addition, the valve element 13 has attached to a closing movement guide portion 29a an O-ring 29 having substantially the diameter as a valve seat-sealing gasket 28. With this slide structure of the O-ring 29, the weight generated as a reaction force of a closing thrust is small even when a reaching pressure is generated in the forward or reverse direction. Thus, use of the spring 27 exhibiting a weight minimum to pressure-seal a valve seat surface 15 enables the valve seat surface 15 to be infallibly sealed.

In FIGS. 4 and 5, an arm portion 5 that supports the disc-shaped slide plate 4 thereon is formed with a notch 5a to have elasticity, thereby permitting itself to be flexed within a range of elastic deformation. The arm portion 5 is provided in its proximal end part with a U-shaped engaging groove 6a, to the lower portion of which a rectangular fitting part 6b is continuously connected. Disposed on the deep surface of the fitting part 6b are an air supply and discharge port 6c and an air discharge port 6d that are buried in the slide plate 4 and have their distal ends opening respectively to the upper surface of the slide plate.

Figure 6:
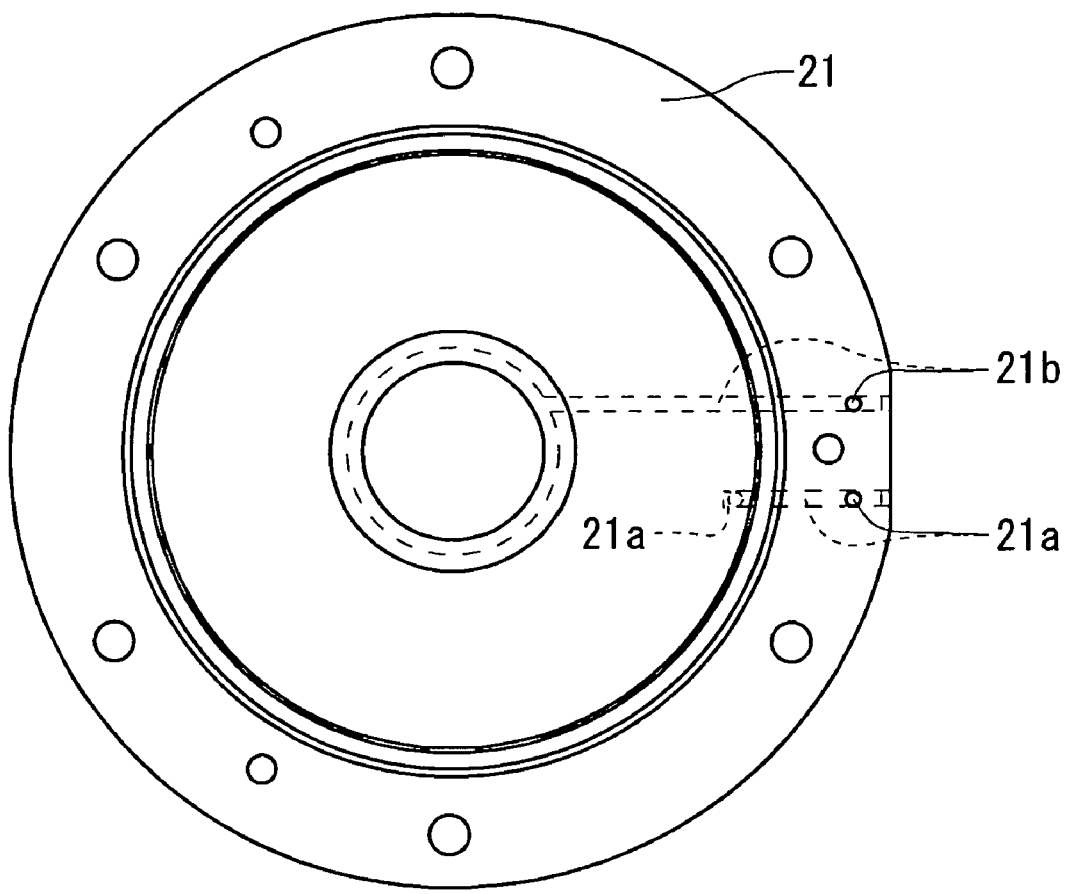
FIG. 6 is a plan view of a cylinder housing shown in FIG. 3.
Figure 7:
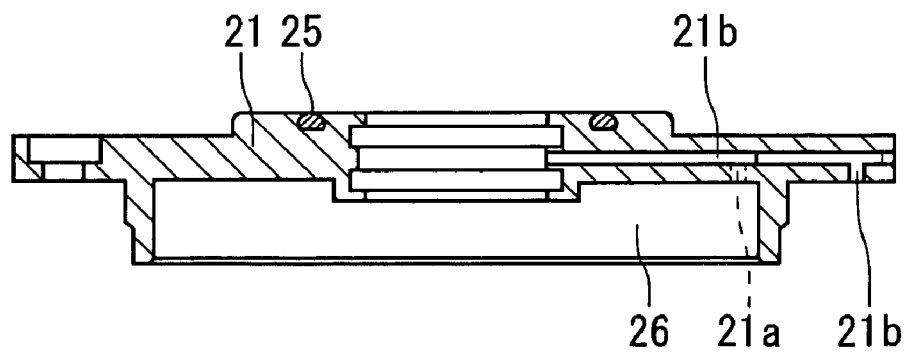
FIG. 7 is a vertical cross section of the cylinder housing shown in FIG. 6.

The cylinder housing 21 is formed, as shown in FIGS. 6 and 6, with a communication port 21a communicating with the air supply and discharge port 6c of the slide plate 4 and an air discharge hole 21b communicating with the discharge port 6d disposed at the center position between the O-rings 22 and 22. The air is discharged from the air discharge hole 21b via the air discharge port 6b and released from an air discharge path 9 to the atmosphere, thereby inducing no operation pressure differential. Thus, the amount of air to be leaked from the seal section to the outside during the piston operation can be made minimum. The communication port 21a has the distal end thereof communicating with the inside of a cylinder 26 constituted by the piston 20 and the cylinder housing 21.

Figure 8:
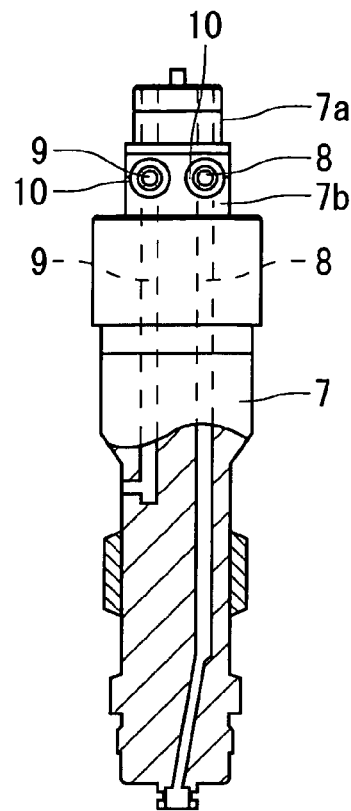
FIG. 8 is a partially cutaway front view of the slide valve shown in FIG. 3.
Figure 9:
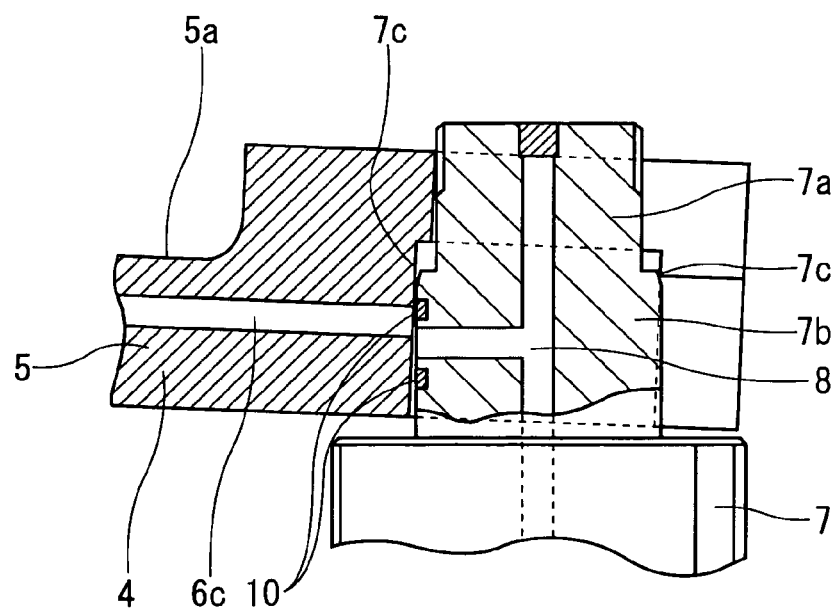
FIG. 9 is a cross section showing the state in which the proximal end of the slide plate is attached to a rotary shaft.
Figure 10:
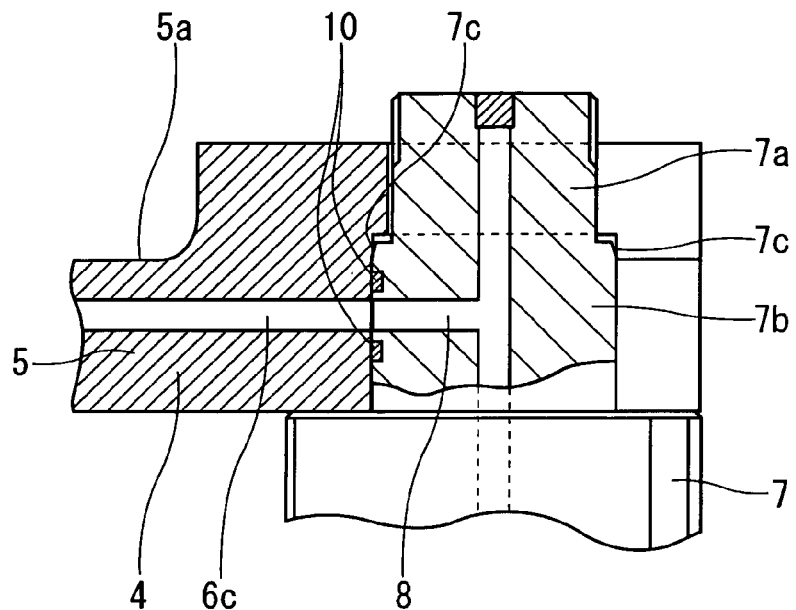
FIG. 10 is a cross section showing the state in which the attachment shown in FIG. 9 has been completed.

As shown in FIGS. 8 to 10, the rotary shaft 7 is formed with a circular part 7a engaged with the engaging groove 6a, a square part 7b fitted in the fitting part 6b, and a tapered part 7c at the shoulder section adjoining the circular part 7a and the square part 7b. The rotary shaft 7 is provided therein with a communication hole 8 and the air discharge path 9 communicating with the air supply and discharge port 6c and the air discharge port 6d to the open sections of which O-rings 10 are attached. The communication hole 8 is provided therein with a sequentially controlled air cylinder drive mechanism to be described later.

When connecting the proximal end of the arm portion 5 of the slide plate 4 to the rotary shaft 7, both the air supply and discharge port 6c and the air discharge port 6d provided in the connecting section of the rotary shaft 7 can simultaneously be sealed with a detachable seal. After the seal is attached, the slide plate 4 is fixed to the rotary shaft 7 with a nut 11 and can be detached from the rotary shaft 7 through detachment of the nut 11.

The U-shaped engaging groove 6a of the slide plate 4 lifted by about 2 to 3 mm as shown in FIG. 9 is inserted onto the square part 7b of the rotary shaft from the lateral direction and, in a state lifted aslant at positions of collision on the O-rings 10 and 10, is further inserted onto the square part 7b and the tapered part 7c. By moving the slide plate horizontal, the weight of the slide plate causes the O-rings 10 and 10 to be compressed, thereby determining the position of the attachment of the slide plate. The slide plate 4 is fixed with the nut 11 to the rotary shaft 7 in the resultant state shown in FIG. 10, wherein the proximal end of the slide plate has been fitted on the rotary shaft.

Figure 11:
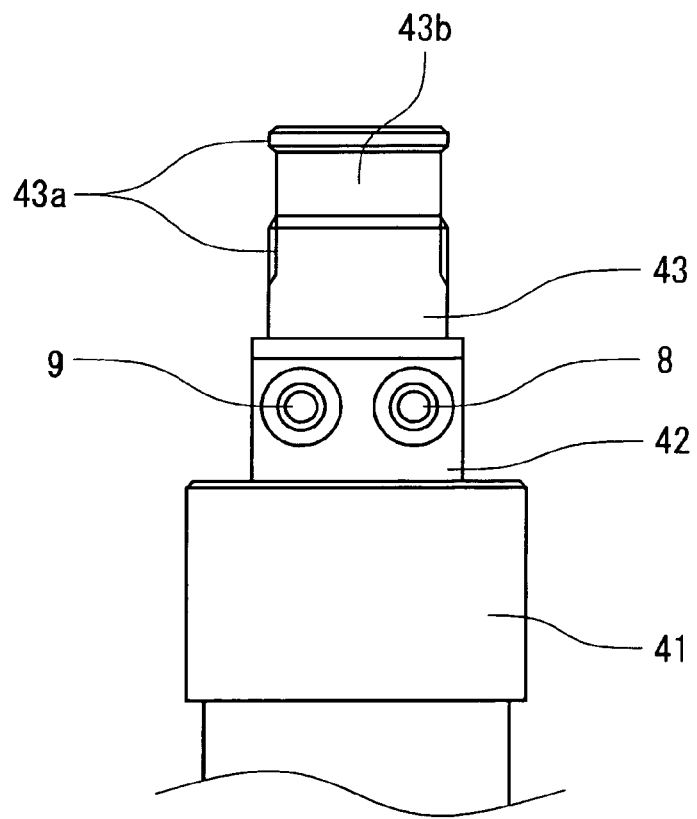
FIG. 11 is a front view showing the principal part of another example of the rotary shaft.
Figure 12:
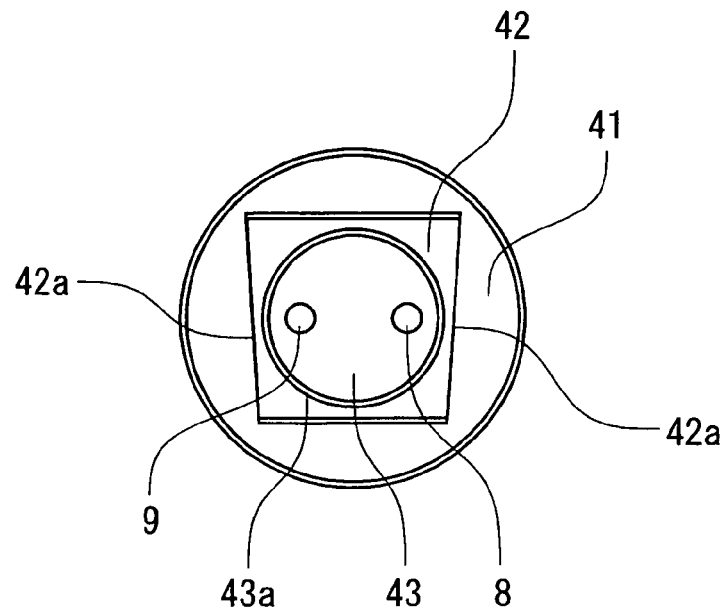
FIG. 12 is a plan view of the rotary shaft shown in FIG. 11.

FIG. 11 is a front view showing the principal part of another example of the rotary shaft, and FIG. 12 a plan view of the rotary shaft. In FIGS. 11 and 12, a rotary shaft 41 is provided on the upper end thereof with a circular part 43 and on the lower portion of the circular part 43 with an adjoining square part 42. The rotary shaft 41 is formed with the communication hole 8 and air discharge path 9 communicating with the air supply and discharge port 6c and air discharge port 6d. The circular part 43 is formed with a screw part 43a and, midway of the screw part, with a small-diameter concave ring 43b. The square part 42 is formed in cross section into a trapezoid having tapered surfaces on the opposite sides thereof.

Figure 13:
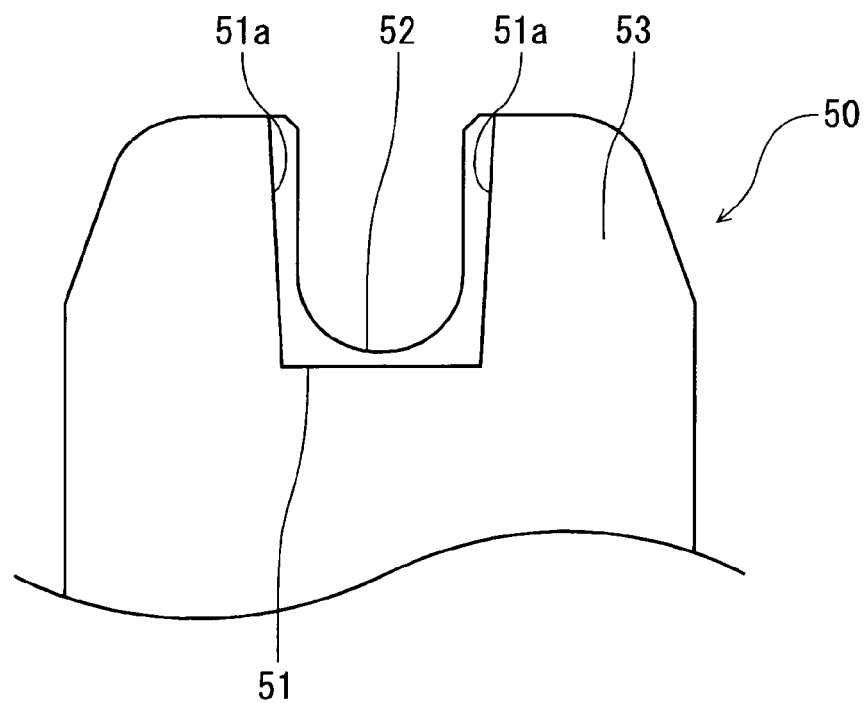
FIG. 13 is a bottom view showing the principal part of another example of the slide plate.

FIG. 13 is a bottom view showing the principal part of another example of the slide plate. In the figure, a disc-shaped slide plate 50 has an arm portion 53 formed therein with a U-shaped engaging groove 52. A trapezoidal fitting part 51 which has tapered surfaces 51 on the opposite sides thereof and which goes hand-in-hand substantially with the square part 42 of the rotary shaft 41 is formed as continued to the lower portion of the engaging groove 52.

Figure 14:
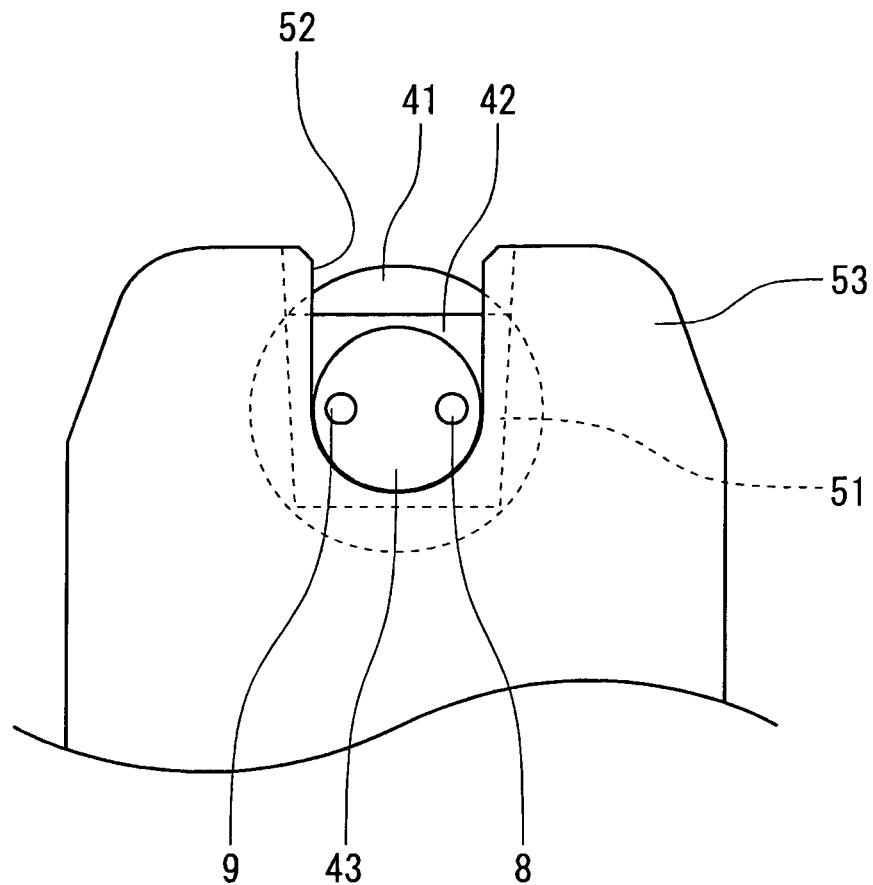
FIG. 14 is a plan view showing the state of engagement between the slide plate and the rotary shaft.

As shown in FIG. 14, the fitting part 51 of the arm portion 53 is inserted onto the square part 42 of the rotary shaft 41 from the lateral direction. In this case, the tapered surfaces 51a of the fitting part 51 are guided to the tapered surfaces 42a of the square part 42 to position the arm portion 53 relative to the rotary shaft 41, thus enabling the fitting part to be smoothly and readily inserted onto the square part and the engaging groove 52 of the arm portion 53 to be fitted infallibly onto the circular part 43 of the rotary shaft 41 without inducing any rattle.

Figure 15:
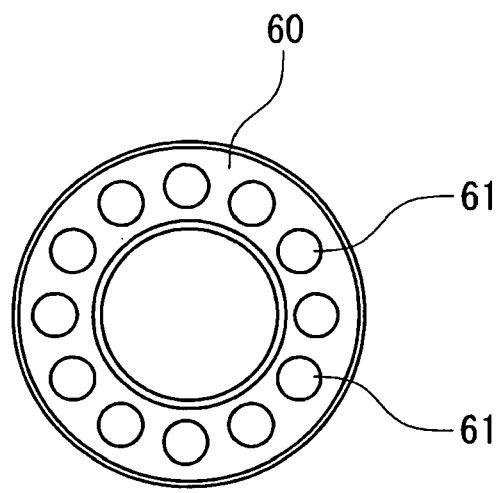
FIG. 15 is a plan view of a nut used for fixing the slide plate.
Figure 16:
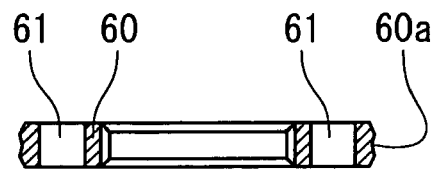
FIG. 16 is a vertical cross section of the nut shown in FIG. 15.
Figure 17:
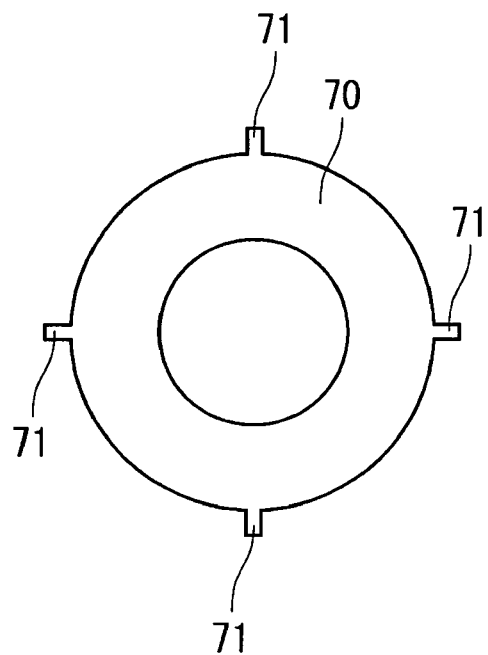
FIG. 17 is a plan view of a washer used for fixing the slide plate.
Figure 18:
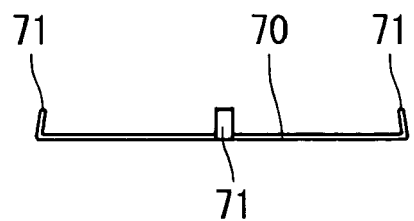
FIG. 18 is a front view of the washer, in use, shown in FIG. 17.

The arm portion 53 and rotary shaft 41 are fastened and fixed with a nut 60 shown in FIGS. 15 and 16. The nut 60 has a plurality of through holes 61 in the circumferential direction thereof and is formed on the side surface thereof with a groove 60a. FIGS. 17 and 18 show a washer 70 used for fastening with the nut 60. The washer 70 has a plurality of protruding engagement pieces 71 formed on the outer end portion thereof at prescribed angular intervals and, in use as shown in FIG. 18, the proximal ends of the engaging pieces are bent upward to engage with the groove 601 of the nut 60 to be prevented from falling off the nut 60. Even when the nut 60 is allowed to loosen, since it is idled along the concave ring 63b, it is possible to prevent the nut 60 from falling off the rotary shaft 41.

Figure 19:
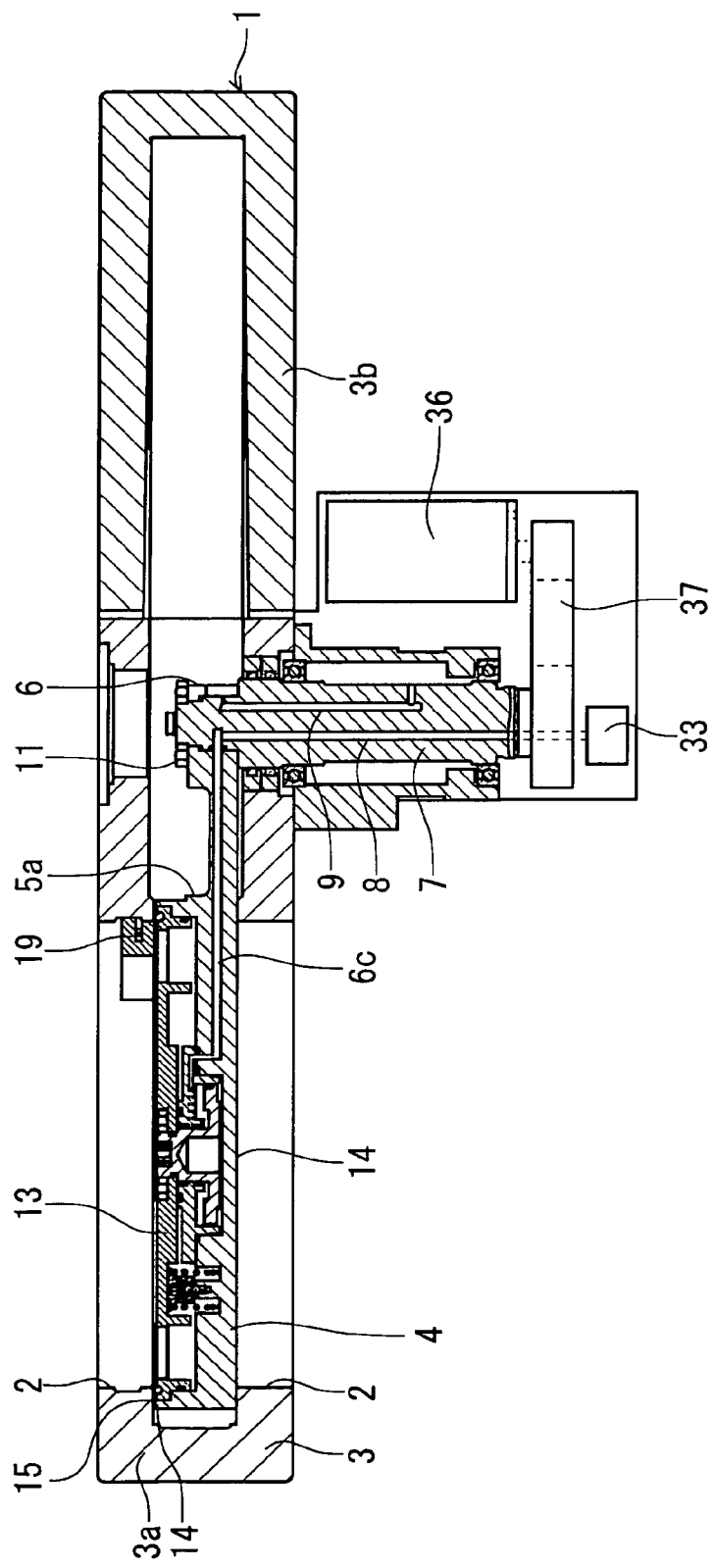
FIG. 19 is a vertical cross section showing an example of driving the slide plate shown in FIG. 3 with a motor.
Figure 20:
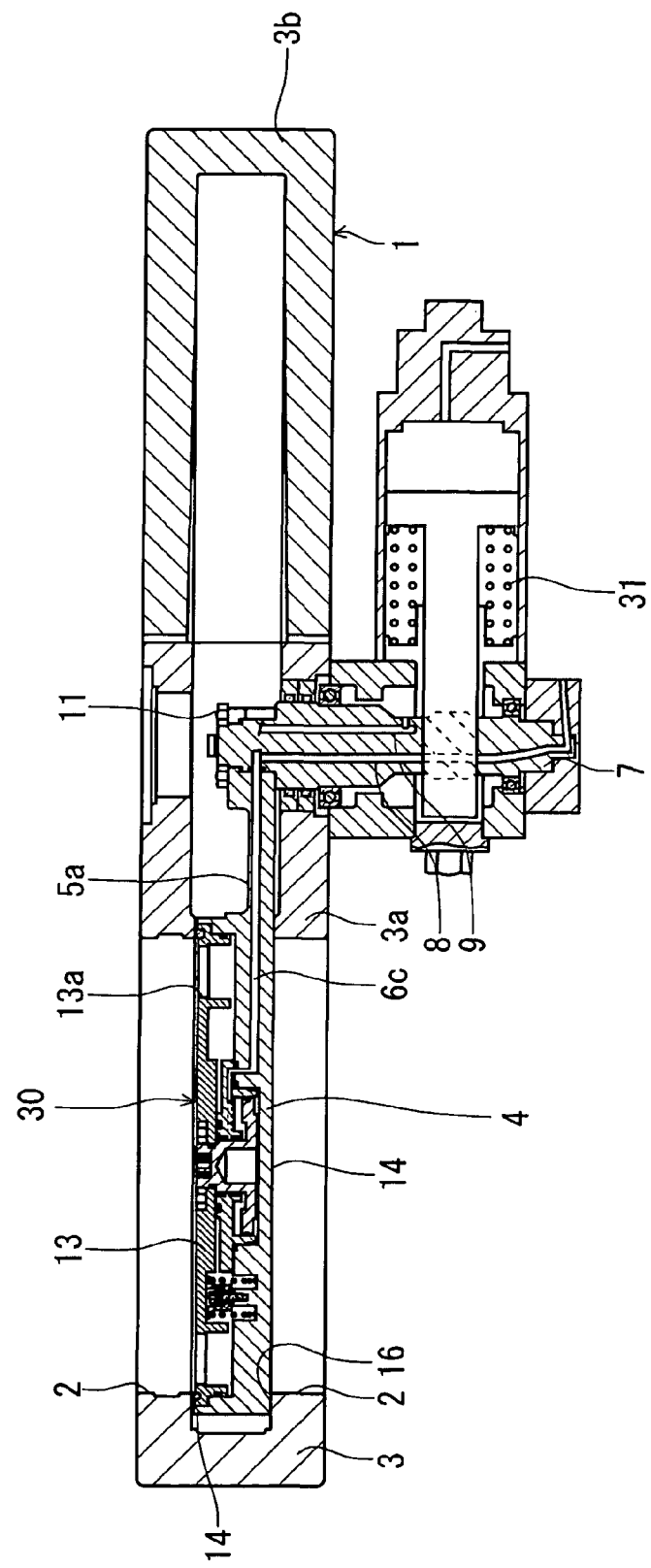
FIG. 20 is a vertical cross section showing an example of driving the slide plate shown in FIG. 3 with an air cylinder.
Figure 21:
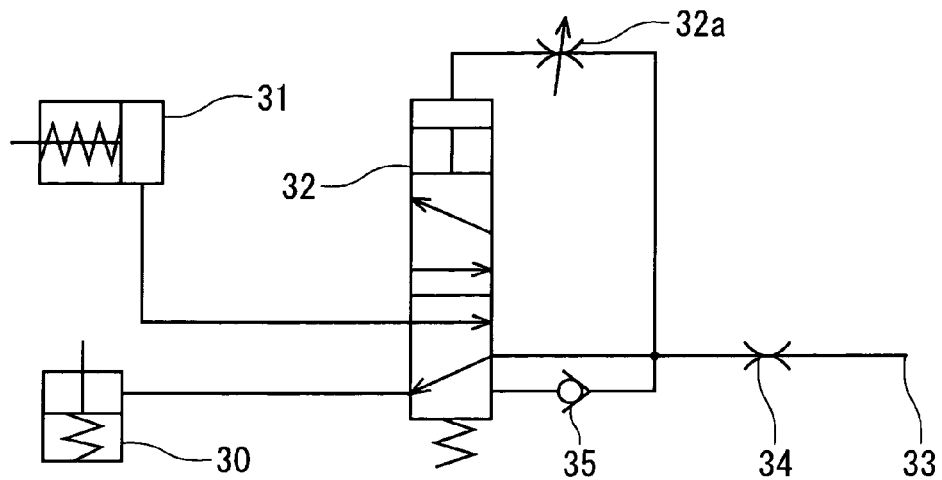
FIG. 21 is a circuit diagram showing an example of NC cylinder mechanism using a delay-switching valve.

A drive source for the slide plate 4 is a motor shown as one example in FIG. 19 or an air cylinder shown as another example in FIGS. 20 and 21. To be specific, according to the motor drive in FIG. 19, the driving force of a stepping motor 36 is transmitted via a belt 37 to a rotary shaft described later, thereby rotating the rotary shaft to rotate the slide plate 4. In this case, the stepping motor 36 is controlled with a controller not shown to operate the valve element 13 while controlling switching thereof, and is used for the slide valve 1 for control.

In the slide valve for control by the motor drive, the body 3 has a control surface provided with a detachable control rib 19. Since the control rib 19 controls a small pressure when the valve port of the flow path 2 has assumed a crescent shape in the vicinity of the fully closed position of the slide plate 4, it is possible to provide a good controllability of the small pressure by control with the opposite surfaces of the slide plate 4. Moreover, the provision of the desirable control rib 19 can suitably vary the control characteristics. In this case, the controllability of the small pressure with the opposite surfaces of the slide plate is good and it is made possible to vary the control characteristics by the desirable control rib provided.

The air cylinder drive has a configuration adopting a combination of two cylinders that are a valve cylinder 30 and a swing cylinder 31 for the slide plate 4 with a delay-switching valve 32 for air operation, as shown in FIGS. 20 and 21. In this case, the range of the operation pressure of the delay-switching valve 32 having a needle 32a is set to be smaller than that of the valve cylinder 30.

An orifice 34 is attached to an air supply port 33 so that the pressures of the swing cylinder 31 and delay-switching valve 32 may be kept substantially identical. To an air supply port for the valve cylinder 30 is attached a check valve 35, whereby the air is supplied to the valve cylinder 30 simultaneously with the air supply and, when the switching valve 32 is operated, the air of the valve cylinder 30 is discharged out.

By adopting a configuration in which the operation can be switched depending on the pressure of the valve cylinder 30 in the range of 0.4 to 0.6 MPa, the swing cylinder 31 in the range of 0.25 to 0.30 MPa and the delay-switching valve 32 in the range of 0.15 to 0.18 MPa, the switching between the cylinders 30 and 31 can be performed with exactitude. When the operation pressure has been discharged from the valve-opening state, for example, the air of the swing cylinder 31 is discharged out and has been evacuated to 0.2 MPa, the swing cylinder swings up to the valve-closing position. However, since the operation pressure of the delay-switching valve 32 is being constricted by the orifice 34 on the air supply port 33, the delay-switching valve 32 is in a state of the same pressure being applied to be prevented from operating during the swinging motion of the swing cylinder.

When the swing cylinder has been further evacuated to 0.2 MPa or less, the delay-switching valve 32 is operated to discharge the air of the valve cylinder 30, thereby closing the valve element 13. While the air is supplied at all times to the valve cylinder 30 so as not to close the valve element even during a long-time operation in the open state, since the operation pressure thereof has to be retained until the delay-switching valve 32 starts to operate, the check valve 35 is provided.

In place of the example in which the valve element 13 having the slide plate 4 incorporated therein is operated with the air cylinder mechanism, the following means may be adopted. For example, a structure may be adopted, in which an air cylinder (not shown) for driving the flow path 2 in the vertical direction is embedded in the slide plate 4 and the air pressure of the cylinder or the thrust of a spring is used to operate a cam (not shown) to open or close the valve element 14 in the direction of the flow path. Alternatively, the valve element 13 incorporated in the slide plate 4 can be opened or closed in the direction of the flow path by an electrical drive device, such as a motor.

Figure 22:
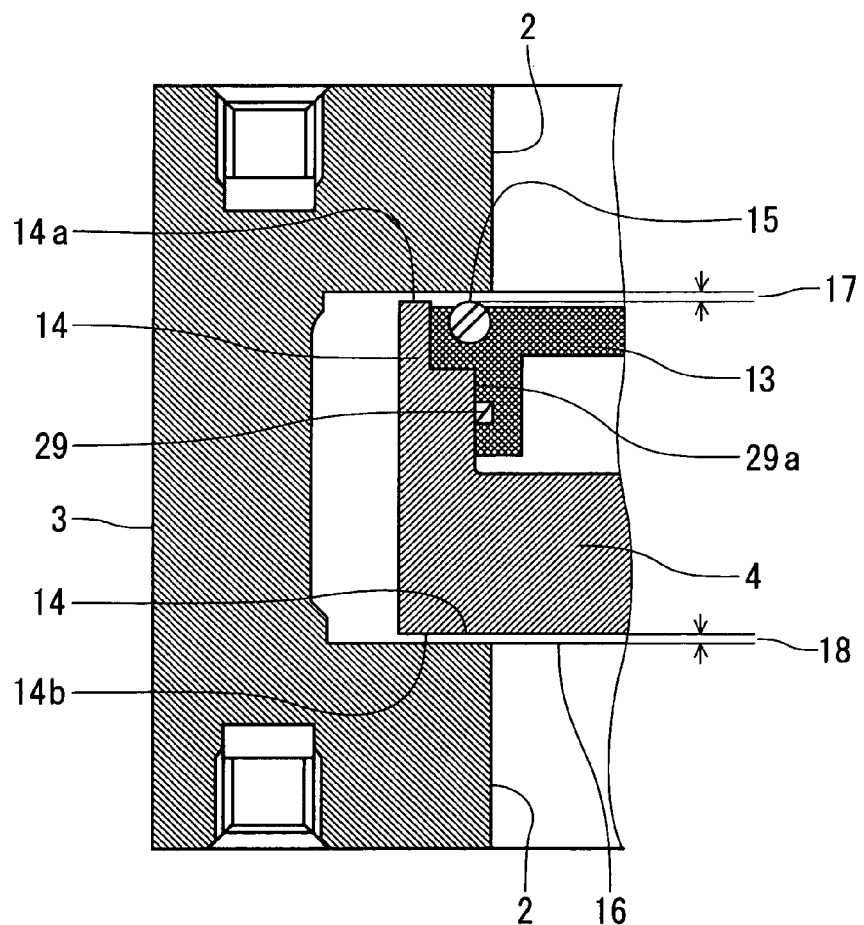
FIG. 22 is an enlarged cross section of part A of the slide valve shown in FIG. 3, showing the valve-opened state of a valve element.
Figure 23:
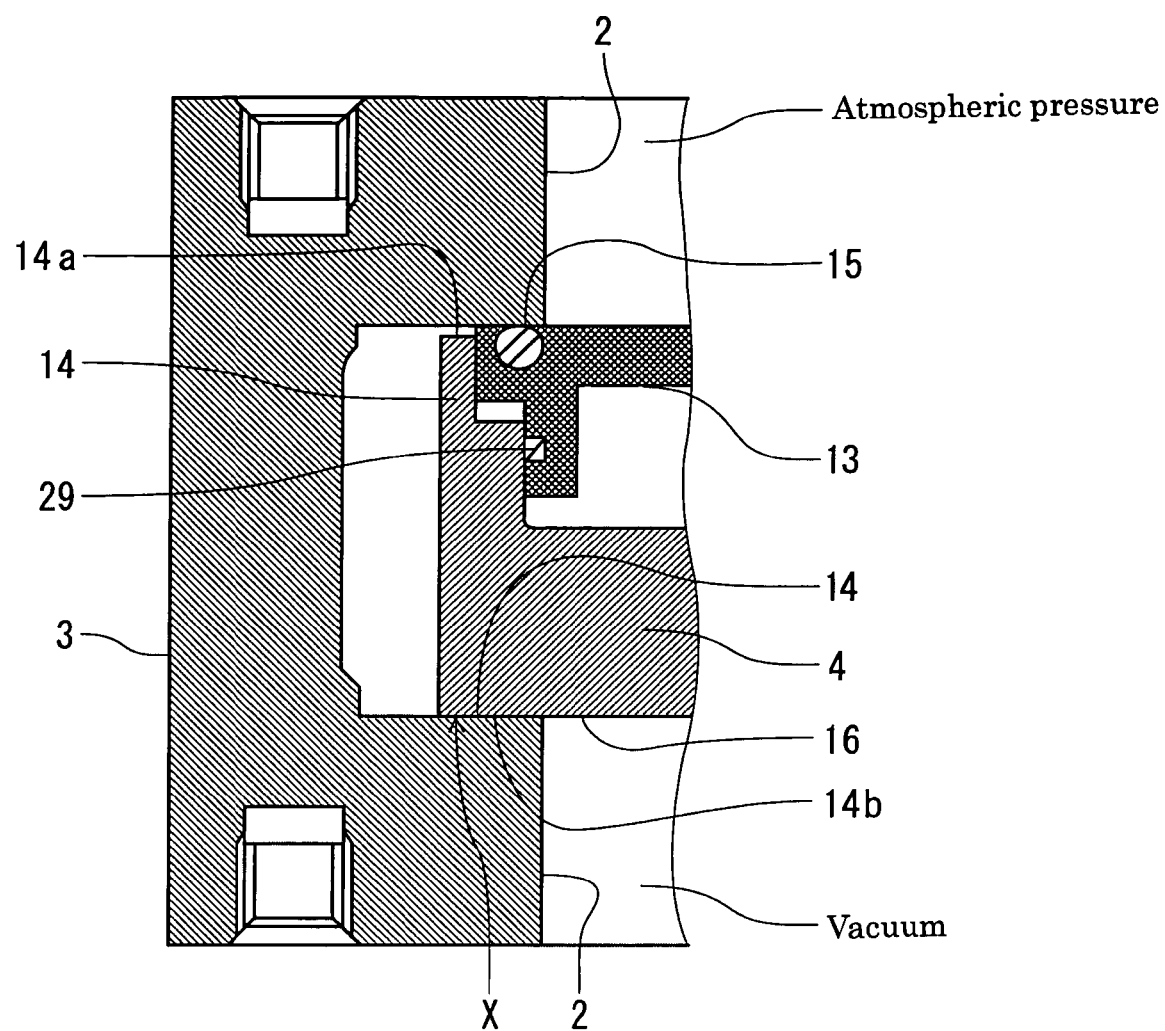
FIG. 23 is an enlarged cross section of part A of the slide valve shown in FIG. 3, showing the valve-closed state of the valve element.
Figure 24:
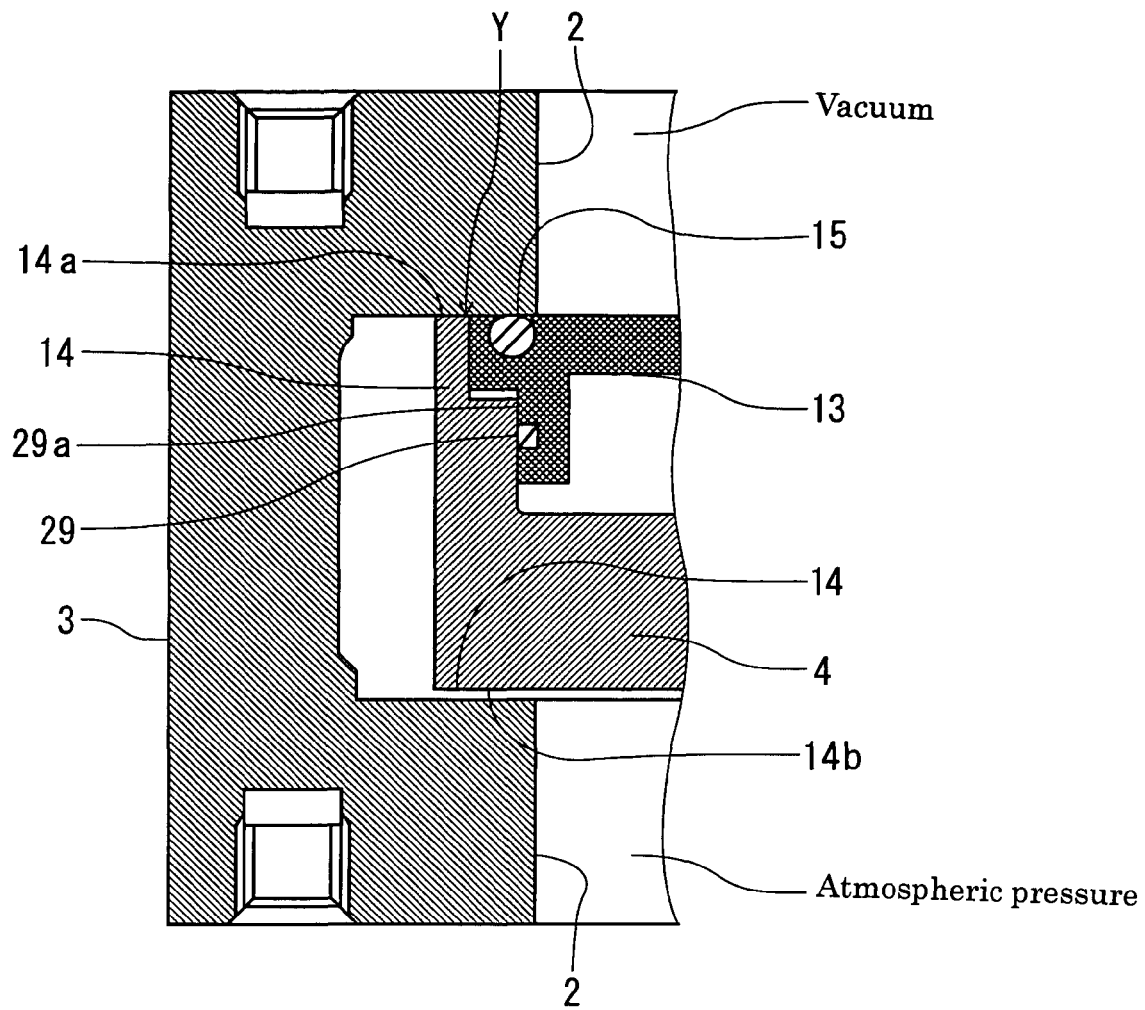
FIG. 24 is an enlarged cross section of part A of the slide valve shown in FIG. 3, showing the valve-closed state of the valve element.

FIGS. 22 to 26 are explanatory views showing the flexure of the slide plate and illustrating the stoppers 14 and 14, in which the valve element 13 opened or closed in the direction of the flow path axis with the air cylinder drive mechanism is incorporated in the slide plate 4 and is stored therein at a position around 1 mm below a stopper surface 14a of the stopper 14 provided as projected from the upper end of the outer circumference of the slide plate 4 to form between the valve seat surface 15 and the upper surface of the slide plate 4 and between the inner circumferential surface 16 of the body 3 and the lower surface of the slide plate, respectively, small clearances 17 and 18 having a size of 0.3 to 0.5 mm, for example. In this case, similarly to the space between the stopper surface 14a and the inner circumferential surface of the body 3, that between the lower surface of the slide plate 4 and the inner circumferential surface of the body is set to have a length in the range of 0.3 to 0.5 mm, and the lower surface of the slide plate serves as a stopper surface 14b. Incidentally, FIGS. 22 to 24 are enlarged views each showing part A in FIG. 3.

FIG. 22 shows the valve element 13 in its open state, in which the control by the stoppers 14 and 14 on the two places of the upper and lower surfaces enables the controllability of the minimum flow rate to be enhanced. FIG. 23 shows the valve element 13 in its closed state, wherein the upper side is kept under the atmospheric pressure and the lower side in a vacuum state, the lower stopper 14 manifests the stopper function, and the valve seat is sealed with the gasket 28. FIG. 24 shows the valve element 13 in its closed state, in which the lower side is kept under the atmospheric pressure and the upper side in a vacuum state, and the upper stopper 14 manifests the stopper function. In this case, the control is performed with the small clearances at the upper and lower surfaces of the slide plate 4. However, this is not limiting. It may be adopted that the lower surface of the slide plate 4 functions as the control surface and that the upper surface thereof merely functions as a stopper.

The arm portion 5 of the slide plate 4 can suppress the flexure of a slide plate unit by its own weight to around 0.1 mm or less and has elasticity so as not to be plastically deformed even when receiving the valve thrust and pressure difference load to induce flexure. Therefore, it is made possible to set the clearances 17 and 18 between the body 3 and the slide plate 4 to a minimum. In addition, since the slide plate 4 has high rigidity, the maximum difference in working pressure range induced in the slide plate while being controlled in pressure can be made large. The area of a valve element of 320 A, for example, is 830 cm$^2$, the valve element is loaded with a load of 1 kgf corresponding approximately to the weight of the slide late when the pressure difference is 10 Torr. As a result, since the flexure of the slide plate becomes twice the flexure by its own weight, the slide plate is liable to come into contact with the body 3. However, by affording high rigidity to the slide plate 4, it is made possible to heighten the maximum difference in working pressure range.

The operation of the above embodiment will now be described. When air of 0.4 MPa, for example, is supplied into the valve cylinder 30, it flows into the cylinder 26 of the piston 20 to press the piston 20 and urge the valve element 13 connected to the piston 20 downward in FIG. 3 to open the valve element 13. In this case, since the delay-switching valve 32 is supplied with air via the orifice 32a, it does not operate for 2 seconds, for example. When the delay-switching valve 32 starts to operate in the 2 seconds and air is supplied into the swing cylinder 31, the slide plate 4 swivels and, under a pressure of 0.3 to 0.4 MPa, produces a fully open position at the position 4A of the slide plate as shown in FIG. 2.

When the air is then discharged, the slide plate swivels and under a pressure of 0.2 MPa, produces a fully closed position as shown in FIG. 3. When the air is further discharged, the delay-switching valve 32 operates under a pressure of 0.2 to 0.1 MPa. In the meantime, when the air in the valve cylinder 30 is discharged, the snap action of the spring 27 operates to urge the valve element 13 in the upward closing direction in FIG. 2, thereby bringing the gasket 28 attached to the valve element 13 into pressure contact with the valve seat surface 15 to retain the valve element 13 in its closed state. In the case of the control slide valve shown in FIG. 19 utilizing the motor drive, the slide plate 4 is caused to swivel by the driving force of the motor 36 to attain controlling, and the operation of the valve cylinder 30 is the same as in the aforementioned example.

Figure 25:
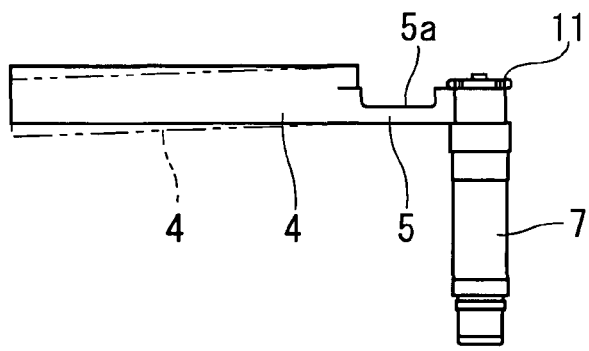
FIG. 25 is an explanatory view showing the flexure of the slide plate.
Figure 26:
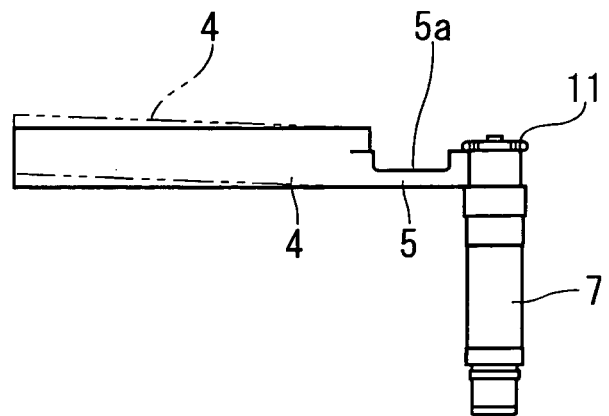
FIG. 26 is an explanatory view showing the flexure of the slide plate.

In the slide plate 4 in the state of opening the valve element 13 as shown in FIG. 22, the clearances 17 and 18 formed at the center position of the body 3 and between the body 3 and the upper and lower surfaces of the slide plate 4 are set to have substantially the same degree of width in consideration of the elasticity of the arm 5 that supports the slide plate 4. When the valve element 13 has been closed and the pressure difference between the atmospheric pressure and the vacuum has been induced in the slide plate 4 as shown in FIG. 23 or 24, therefore, the slide plate 4 is flexed within the range of plastic deformation, and the lower or upper surface of the slide plate 4 constitutes a stopper X or Y depending on the direction of receiving the pressure as shown in FIGS. 25 and 26. Thus, no plastic deformation is produced even when receiving the load resulting from the valve thrust and the received pressure.

Figure 27:
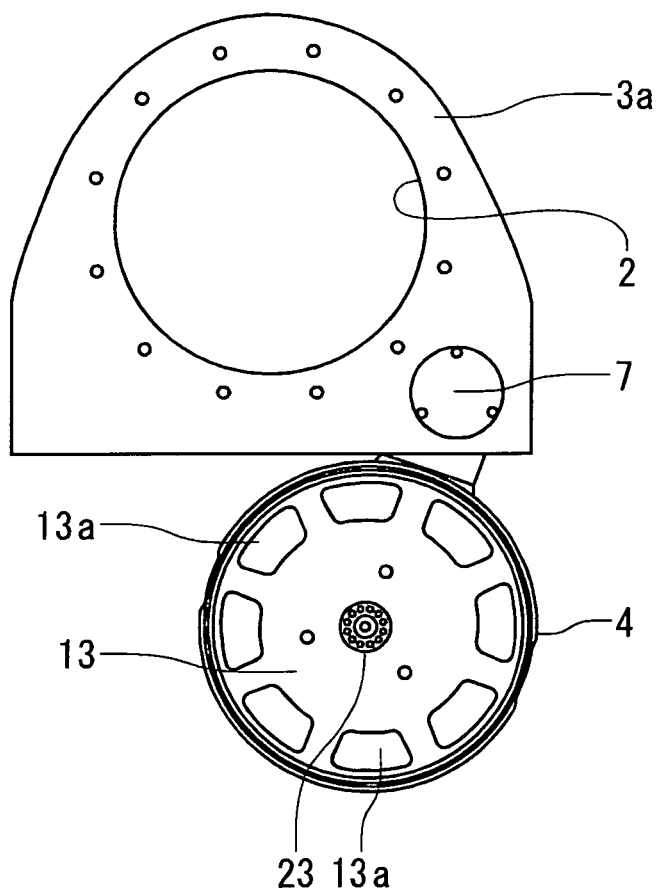
FIG. 27 is a plan view showing the state in which a cover has been detached and the slide plate has been rotated to a attachment and detachment position.

In addition, the fastening means 12 for the body 3 shown in FIG. 2 can be detached to detach the cover body 3b from the main body 3a, and the slide plate 4 is then rotated to a position shown in FIG. 27. When the nut 11 for the rotary shaft 7 is detached in that state, since the slide plate 4 having the valve element 13 etc. incorporated therein can easily be detached, the cleaning or maintenance can be performed with extremely high workability. In this case, mere detachment of the nut 11 enables the slide plate 4 to be detached and the subsequent detachment of the nut 23 enables the parts incorporated in the slide plate 4, such as the valve element 13, to be separated from the slide plate. Thus, maintenance can be performed with precision. On the other hand, when attaching the slide plate 4, the proximal end part of the slide plate 4 is attached to the rotary shaft 7 with the nut 11. This is easy to perform.

Incidentally, the parts configured to contact a gas including the body 3, valve element 13 and slide plate 4, are made of stainless steel, aluminum, etc. resistant to chemicals.

Figure 28:
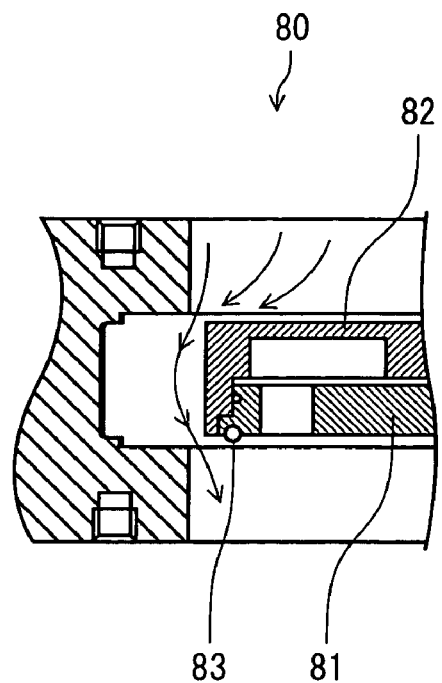
FIG. 28 is a cross section showing the principal part of another slide valve showing a controlled valve travel position of a slide plate.
Figure 29:
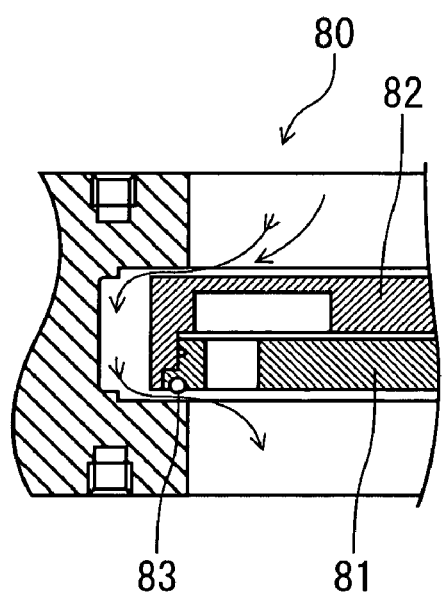
FIG. 29 is a cross section showing the principal part of the slide valve shown in FIG. 28, showing a fully closed position of the slide plate.
Figure 30:
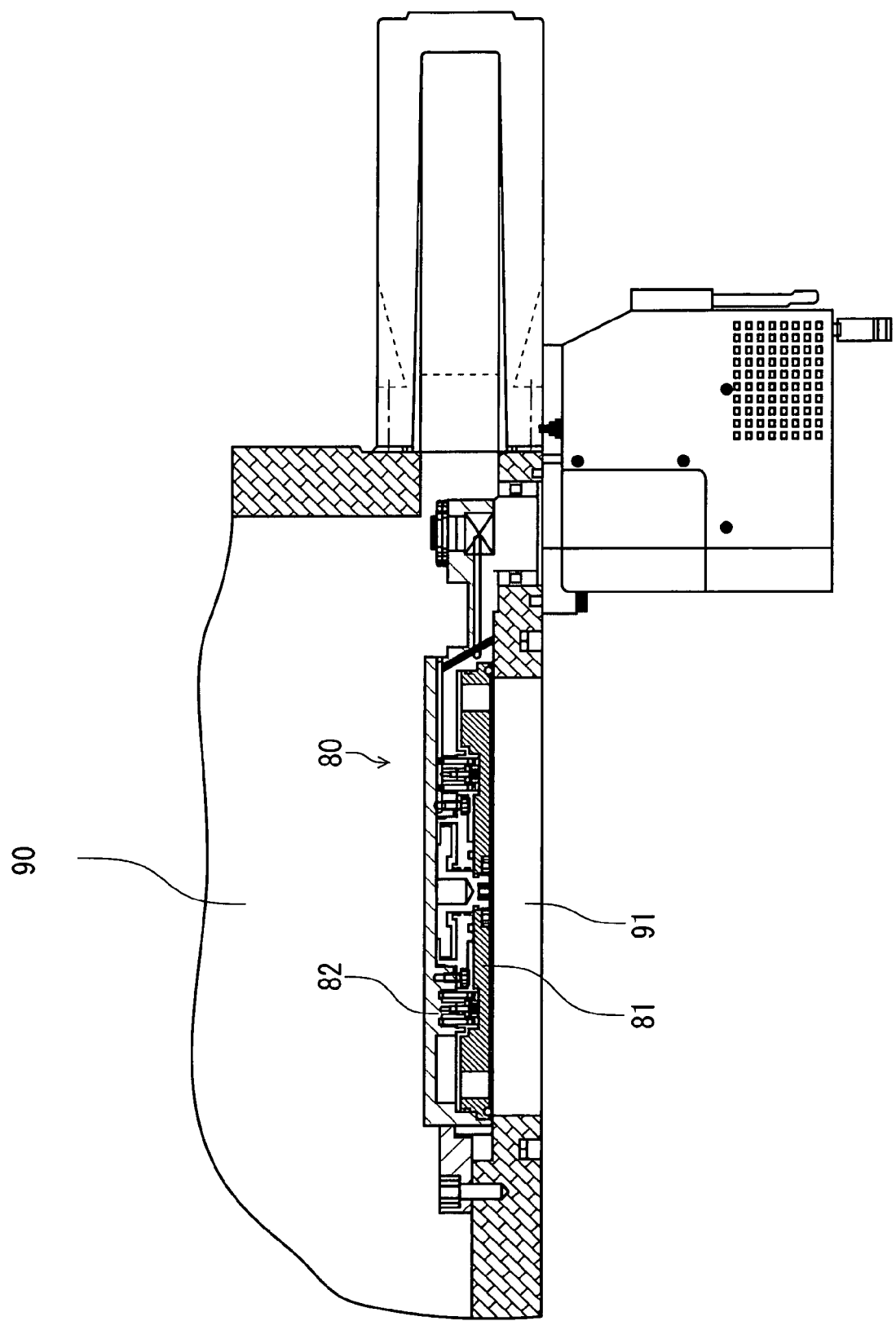
FIG. 30 is a vertical cross section showing an example in which the slide valve has been incorporated into a chamber.

While the present invention has been described in detail in the foregoing with reference to the embodiment, it is not limited thereto and may variously be altered within the scope of the appended claims not departing from the spirit of the present invention. As in a slide valve 80 shown in FIGS. 28 and 29, for example, by incorporating a valve element 81 into a slide plate 82 on the downstream side, a seal member, such as a gasket, attached to the valve element is less liable to be influenced by the flow of a fluid to suppress the seal member 83 from corrosion. Furthermore, since the influence by plasma or by-products also becomes small, the degree of corrosion can be reduced. Incidentally, FIG. 28 shows the controlled valve travel position of the slide plate 82, and FIG. 29 shows the fully closed position of the slide plate 82. In addition, as shown in FIG. 30, the slide valve 80 may be attached directly to an opening 91 of a chamber 90 of a semiconductor-fabricating apparatus. As a result, use of a wiring can be eliminated to enable a compact fabrication apparatus to be obtained at a low cost. In this case, incorporation of the valve element 81 into the slide plate 82 on the downstream side can suppress corrosion of the valve element 81.

INDUSTRIAL APPLICABILITY

The slide valve according to the present invention is applicable to a vacuum pumping system for a fabrication apparatus for semiconductors, liquid crystals, etc.

The invention claimed is:
1. A slide valve comprising:
a body having a flow path and a rotary shaft;
a slide plate having a proximal end, provided within the body and between a closing position preventing a flow on the flow path and an open position permitting the flow, the slide plate being disposed perpendicularly relative to a flow path axis and movable horizontally, the rotary shaft having a communication hole and an air discharge path at a portion thereof to be connected to the proximal end of the slide plate, the slide plate having an air supply and discharge port and an air discharge port;

a valve element incorporated in the slide plate and movable in a direction of the flow path axis to switch between the closing position and the open position of the slide plate, wherein the proximal end of the slide plate is detachably attached to the rotary shaft of the body; and a detachable O-ring for simultaneously sealing the communication hole, air discharge path, air supply and discharge port, and air discharge port.

2. A slide valve according to claim 1, wherein the proximal end of the slide plate has a trapezoidal shape and the rotary shaft of the body has a trapezoidal portion in which the trapezoidal shape of the rotary shaft is fitted, whereby the proximal end is connected to the rotary shaft, with the trapezoidal shape of the rotary shaft fitted in the trapezoidal portion.

3. A slide valve according to claim 1, wherein the rotary shaft has a screw part to which the proximal end of the slide plate is fastened via a nut, and the slide plate is movable horizontally in a state of being not slid.

4. A slide valve according to claim 3, wherein the screw part of the rotary shaft is provided midway thereof with an unwrought part at which the nut is idled to be prevented from falling off.

5. A slide valve according to claim 1, further comprising a cylinder for closing the valve element, wherein the cylinder has a piston rod having a dual seal structure and the air discharge port of the slide plate communicates with an intermediate part of the dual seal structure.

6. A slide valve according to claim 1, wherein the valve element is incorporated in the slide plate on a downstream side of the slide plate.

7. A slide valve according to claim 1, further comprising an apparatus chamber having an opening, wherein the body is attached directly to the opening.

* * * * *